United States Patent [19]

Batchelder

[11] Patent Number: 5,426,722
[45] Date of Patent: Jun. 20, 1995

[54] METHOD FOR OPTIMIZING THE MOTION OF A MULTI-AXIS ROBOT

[75] Inventor: John S. Batchelder, Somers, N.Y.

[73] Assignee: Stratasys, Inc., Eden Prairie, Minn.

[21] Appl. No.: 119,260

[22] Filed: Sep. 9, 1993

[51] Int. Cl.⁶ .................. G06F 15/46; G05B 19/42
[52] U.S. Cl. ...................................................... 395/80
[58] Field of Search ............... 395/85, 87, 91, 95, 395/96; 318/568.15, 568.18, 573

[56] References Cited

U.S. PATENT DOCUMENTS

| | | | |
|---|---|---|---|
| Re. 30,132 | 10/1979 | Irie | 395/87 |
| 3,748,563 | 7/1973 | Pomella et al. | 318/573 |
| 4,415,967 | 11/1983 | Russell | 364/168 |
| 4,488,242 | 12/1984 | Tabata et al. | 395/94 |
| 4,617,502 | 10/1986 | Sakane et al. | 318/568.18 |
| 4,618,808 | 10/1986 | Ish-Shalom et al. | 318/696 |
| 4,629,860 | 12/1986 | Lindbom | 219/215 |
| 4,639,878 | 1/1987 | Day et al. | 395/94 |
| 4,749,347 | 6/1988 | Valavaara | 425/135 |
| 4,769,583 | 9/1988 | Goor | 318/568.18 |
| 4,773,025 | 9/1988 | Penkar et al. | 395/87 |
| 4,829,219 | 5/1989 | Penkar | 395/87 |
| 4,843,287 | 6/1989 | Taft | 318/568.16 |
| 4,916,636 | 4/1990 | Torii et al. | 395/80 |
| 4,925,312 | 5/1990 | Onaga et al. | 395/96 |
| 4,990,838 | 2/1991 | Kawato et al. | 318/568.10 |
| 5,179,514 | 1/1993 | Rastegar et al. | 395/85 |
| 5,276,383 | 1/1994 | Nishimura et al. | 318/568.15 |
| 5,303,141 | 4/1994 | Batchelder et al. | 364/149 |

OTHER PUBLICATIONS

Zolghodri et al, "A Supervised Path Planner", 5th Int'l Conf on Advanced Robots in Unstructured Robotics, Environments, Jun. 19-22 1991, pp. 1710-1713 vol. 2.
Lin et al, "Manipulator Control with Torque Interpolation", 1990 IEEE Int'l Conf on Systems, Mon. & Cybernetics, Nov. 4-7 1990, pp. 624-626.
Algorithms, Addison-Wesley, New York, 1988, ISBN 0-201-06673-4, pp. 132-139.

Primary Examiner—Allen R. MacDonald
Assistant Examiner—Stuart B. Shapiro
Attorney, Agent, or Firm—Moore & Hansen

[57] ABSTRACT

A method for determining an optimal trajectory and velocity for an open loop stepper motor driven robot (1) is disclosed, as is an open loop robotic system suitable for use in, by example, a rapid prototyping system (10). The method utilizes a deflection angle calculation of a maximal velocity for each vertex of a set of vertices that define a desired trajectory, a heap sort for globally ensuring that none of the vertices have an excessive velocity, and a vertex adding technique that ensures that the robot is performing straight line moves as rapidly as is possible.

6 Claims, 6 Drawing Sheets

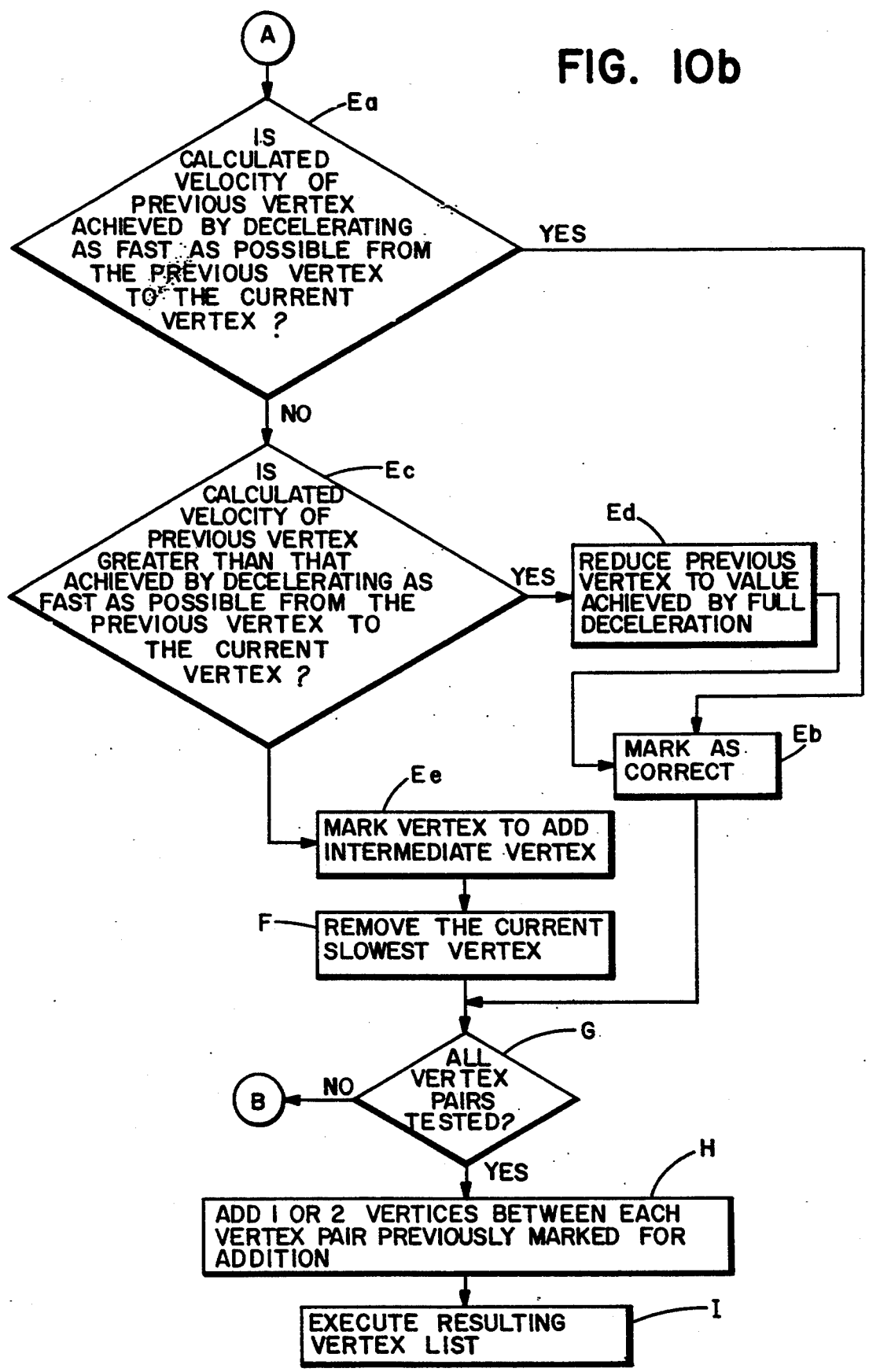

METHOD FOR OPTIMIZING THE MOTION OF A MULTI-AXIS ROBOT

FIELD OF THE INVENTION

This invention relates generally to the control of motors and, in particular, to the control of stepper motors such as those employed in robotics and rapid prototyping applications.

BACKGROUND OF THE INVENTION

High performance robotic systems may use closed loop control such as position, velocity, and acceleration sensors, feedback and feed forward calculations, and signal filtration. The use of feedback enables a level of performance near optimal levels of speed and accuracy for point-to-point moves.

As an example, a robotic system that is adapted for a rapid prototyping system (RPS), and that employs feedback to control a position of an extrusion nozzle in an x-y-z coordinate reference frame, is disclosed in commonly assigned U.S. patent application Ser. No. 08/034,180, filed Mar. 22, 1993, entitled "Model Generation System Having Closed-Loop Extrusion Nozzle Positioning", by J. S. Batchelder et al., which is a continuation of Ser. No. 07/637,570, filed Jan. 3, 1991 (abandoned).

An example of the generally applied use of feedback in robotics, through the use of encoders and possibly tachometers, is shown in U.S. Pat. No. 4,749,347.

However, for low cost robot actuators the additional cost of providing feedback sensors and servo amplifiers may be prohibitive.

Synchronization of multiple axis motion may also be required in robotic applications. Master/slave techniques are typically used, such as described in "Multi-axis Controller", by R. C. Russell, U.S. Pat. No. 4,415,967.

Optimization of a point-to-point move time may not, however, optimize the total move time over a trajectory. In an application of particular interest, the problem that is addressed by this invention can be understood by comparing two simple trajectories.

In a first case, 1000 line segments each 0.01 inches long are concatenated to form a circle with a diameter of 3.18 inches. Ignoring truncation effects due to the finite step size possible along each axis, the maximum speed that a robot should make this circular move is dictated by the amount of centripetal acceleration that the mechanism can accurately sustain. For a typical case of 0.3 g's of acceleration, the robot should be able to negotiate the circle at an average peak speed of 13.6 inches per second, not including the portions required for longitudinal acceleration and deceleration.

In a second case, 1000 moves of 0.01 inches form a stair case so that there is a 90 degree turn between each segment. If it is assumed that the step size should set the desired accuracy of the system, then the 90 degree changes of direction must be accomplished in a single motor step. Again for 0.3 g's of acceleration, and assuming a typical step size of 0.0003 inches, it is found that the velocity at the corners is maximally 0.132 inches per second. Even assuming that the robot accelerates and decelerates as fast as possible on the segments between the corners, the maximum velocity on average is 1.05 inches per second, more than an order of magnitude slower than for the first case.

Clearly, it is necessary to look ahead a considerable distance to determine the nature of the trajectory. If there are sharp turns coming, the velocities should be sufficiently reduced so that acceleration limits are not exceeded. It is also desirable to use the acceleration capabilities of the robot to the greatest extent possible, which means that the robot should preferably always either be accelerating or decelerating.

Several known types of high performance robotic controllers measure instantaneous position, velocity, and acceleration, and use this information with feed forward corrections based on the coming trajectory to control straight line point-to-point moves. These real time controllers use the fastest available digital signal processor hardware, but are constrained to look, at most, two point-to-point moves ahead. As was indicated in the foregoing example, such a short look-ahead approach can require a significant transit time over a trajectory, as compared to a trajectory that has been globally maximized.

SUMMARY OF THE INVENTION

It is an object of this invention to accurately predict how the kinematics of a robot will dictate the detailed characteristics of a time optimized trajectory, and to then use a simple, time based controller to generate the actuator pulse trains required to realize the trajectory.

It is a further object of this invention to provide methods and apparatus for accomplishing trajectory optimization before the execution of a robot movement.

Another object of this invention is to provide methods and apparatus that enable a look-ahead length of thousands of straight line point-to-point moves, using currently available microprocessor technology, to yield a globally optimized trajectory.

A further object of this invention is to provide methods and apparatus for pre-processing a desired trajectory to optimize motor drive sequences so as to traverse the trajectory as rapidly as is possible, and without exceeding the mechanical contraints of the underlying robotics system.

The foregoing and other problems are overcome and the objects of the invention are realized by a method for determining a globally optimal trajectory and velocity for a motor-driven robot. The method utilizes a deflection angle calculation of a maximal velocity for each vertex, a heap sort for globally ensuring that none of the vertices have an excessive velocity, and a vertex adding technique that ensures that the robot is performing straight line moves as rapidly as is possible.

More particularly, this invention provides a method for reducing a time required for an object to be driven by a plurality of motors over a predetermined trajectory through an n-dimensional space, wherein n is equal to or greater than two. The trajectory is defined by a plurality of vertices each having coordinates that define a location within the n-dimensional space. The method includes the steps of: (a) providing a set of vertices that define a desired trajectory, each vertex being separated from at least one other vertex by a line segment; (b) for each vertex, determining a maximum velocity that can be sustained while translating the object through a point in the trajectory that corresponds to the vertex; (c) modifying the vertex list, if required, to achieve a velocity profile over the trajectory that causes the object to traverse the trajectory in the shortest period of time, without exceeding the maximum velocity at any vertex; and (d) translating the modified vertex list into motor drive signals for causing the plurality of motors to translate the object in accordance with the modified vertex list.

In a preferred embodiment of an open loop robotics system, that operates in accordance with the method, the motors are stepper motors that move a step distance of $d_j$ in response to drive signal pulse, where J is the number of degrees of freedom, and where $1 \leq j \leq J$. Translating the object through a point in the trajectory from a vertex $i-1$ to i to $i+1$ is shown to result in a deflection of angle $\theta_i$. An aspect of this invention employs a value of $\cos\theta_i$ to determine a delay time between drive signal pulses for a stepper motor associated with an axis having a fastest movement, also referred to as a master axis.

The step of modifying includes the steps of: (a) determining a velocity profile over a run length corresponding to the desired trajectory, the velocity profile being determined in accordance with a dynamic characteristic of the stepper motor, such as torque; (b) testing an effect of maximum accelerations and maximum decelerations between pairs of vertices to determine if a resulting velocity would exceed the determined maximum velocity at one of the vertices of the pair; and (d) adjusting the velocities of vertices to enable the use of maximum accelerations and decelerations between vertices, and inserting, if required, one or more intermediate vertices between the vertices of the pair.

BRIEF DESCRIPTION OF THE DRAWINGS

The above set forth and other features of the invention are made more apparent in the ensuing Detailed Description of the Invention when read in conjunction with the attached Drawings, wherein:

FIGS. 10a and 10b depict a flowchart illustrating a presently preferred method of the invention.

DETAILED DESCRIPTION OF THE INVENTION

Figure 1A:
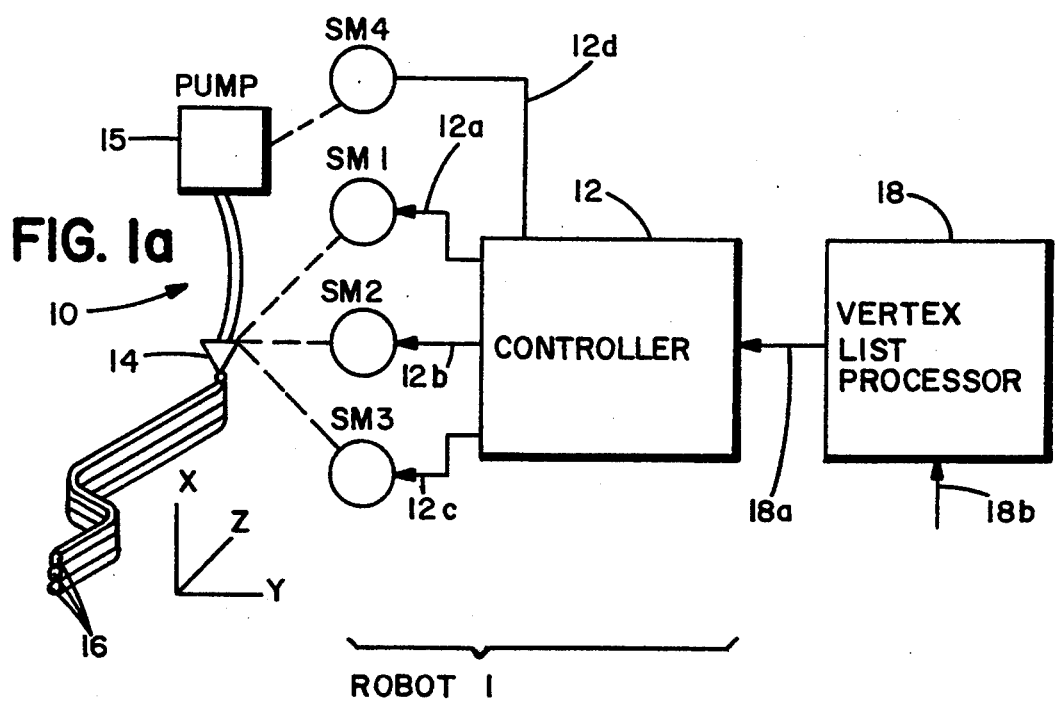
FIG. 1a is a block diagram of a rapid prototyping system that includes a robot that positions a fabrication tool in accordance with this invention.

FIG. 1a is a block diagram that illustrates the use of the invention in a rapid prototyping system 10. A robot is generally indicated by the numeral 1. The robot 1 includes a real time controller 12 having outputs 12a–12d coupled to a plurality of stepper motors (SM1–SM4). The stepper motors operate in a conventional fashion so as to provide an incremental rotation (step) of a shaft in response to an input pulse. The stepper motors can also be of the type that provide an incremental linear motion of an actuator element in response to an input pulse. The stepper motors are mechanically coupled to a tool 14 that is used in the rapid prototyping process. By example, the tool 14 is an extrusion nozzle that is coupled to a pump 15 which provides a source of extrudate, such as a polymer. The end result is the controlled deposition of beads 16 of extrudate so as to form a three dimensional model of an object of interest. The illustrated system is a four degree of motion system wherein the tool 14 is translated within an x-y-z coordinate reference frame by the action of the stepper motors SM1–SM3, plus the extrusion rate of the nozzle controlled by SM4. It should be realized that one or more of the stepper motors can be mechanically coupled to a support structure (not shown) that supports the object during the fabrication thereof. In this type of system the tool 14 may be provided with several degrees of freedom, as may be underlying support structure.

The step size along each axis defines the accuracy to which the position along that axis will be determined ($\pm \frac{1}{2}$ of the step size). The deflection angle calculation assumes errors of the order of $\frac{1}{2}$ step size are acceptable so that finite deflection angles can be navigated at reasonable velocities. If, instead of a stepper motor, it is desirable to use a synchronous motor and encoder, the following analysis will also apply as long as 2X the positioning error of the closed loop system is used instead of the step size of the stepper motor.

If a microstepping stepper motor driver is used, then subsequent references to a "step" should be interpreted as "microstep".

It is pointed out that the robot 1 is an open loop system and does not require the use of positional or other types of feedback to control the positioning of the tool 14.

It should also be appreciated that the use of an extrusion nozzle for the tool 14 is exemplary only, in that the tool 14 could comprise, by example, a laser or a means for directing a laser beam so as to cure a photopolymer, as is accomplished in stereolithography prototyping systems. Also by example, the tool 14 could be a device, such as a laser or a nozzle for directing a flow of abrasive material, so as to selectively remove material from a block of material.

In general, the teaching of this invention can be applied with advantage in any robotic system where performance is determined by navigating a complex path quickly (at non-uniform velocity). Such applications include flatbed and drum plotters, maze following, glue and caulk applications, film patterning, and soldier paste extrusion. The teaching of this invention may also be used, although with less benefit, in applications requiring constant feed rates, such as machining and painting.

That is, the teaching of the invention is applicable to three dimensional prototyping systems that operate by additive or subtractive methods. Furthermore, the teaching of this invention is applicable to applications other than rapid prototyping systems, particularly applications wherein it is desired to controllably position and/or translate an object.

In accordance with the teaching of this invention, a processor 18 has an output 18a coupled to an input of the controller 12 and provides a vertex list that is optimized to most efficiently utilize the robot 1. The operation of the processor 18 is described in detail below. The processor 18 has an input 18b for receiving a vertex list from a source, such as an interactive Computer Aided Design (CAD) system. The vertex list that is output by the CAD system may be a specification of at least an outer shell, and possibly also internal support structures, of a three dimensional object to be fabricated by the robot 1. The generation of such vertex lists, based upon an operator's input, is well known in the art, and will not be further described in detail. In general, the vertex list specifies the desired motion of the system by a sequence of straight line segments from one vertex to the next.

What is now described is a presently preferred method for determining the least time motion of the stepper motor driven robot 1 through a given trajectory.

The method assumes that the following conditions exist.

1. A set of vertices or points in 2 space, 3 space, or higher dimensionality (additional degrees of freedom) are given that define a desired piecewise linear trajectory for an object: $V_i=(x_i, y_i, z_i, p_i, \ldots)$ $1 \leq i \leq N$.
2. A spatial position of an object is manipulated by stepper motors with known dynamic characteristics, such as torque curves and time responses.
3. The mechanical characteristics of the robotic manipulator are not time dependent.

A first goal is to cause the robot 1 to traverse the desired trajectory as quickly as possible. A second goal is to accomplish this process as inexpensively as possible. This second goal suggests an open loop (no feed back) stepper motor system. To maintain the computational requirements to a minimal level, a related goal is to predetermine an optimal control sequence (i.e., which stepper motors to pulse at what times), allowing the inexpensive real-time controller 12 to execute the predetermined sequence.

Figure 10A:
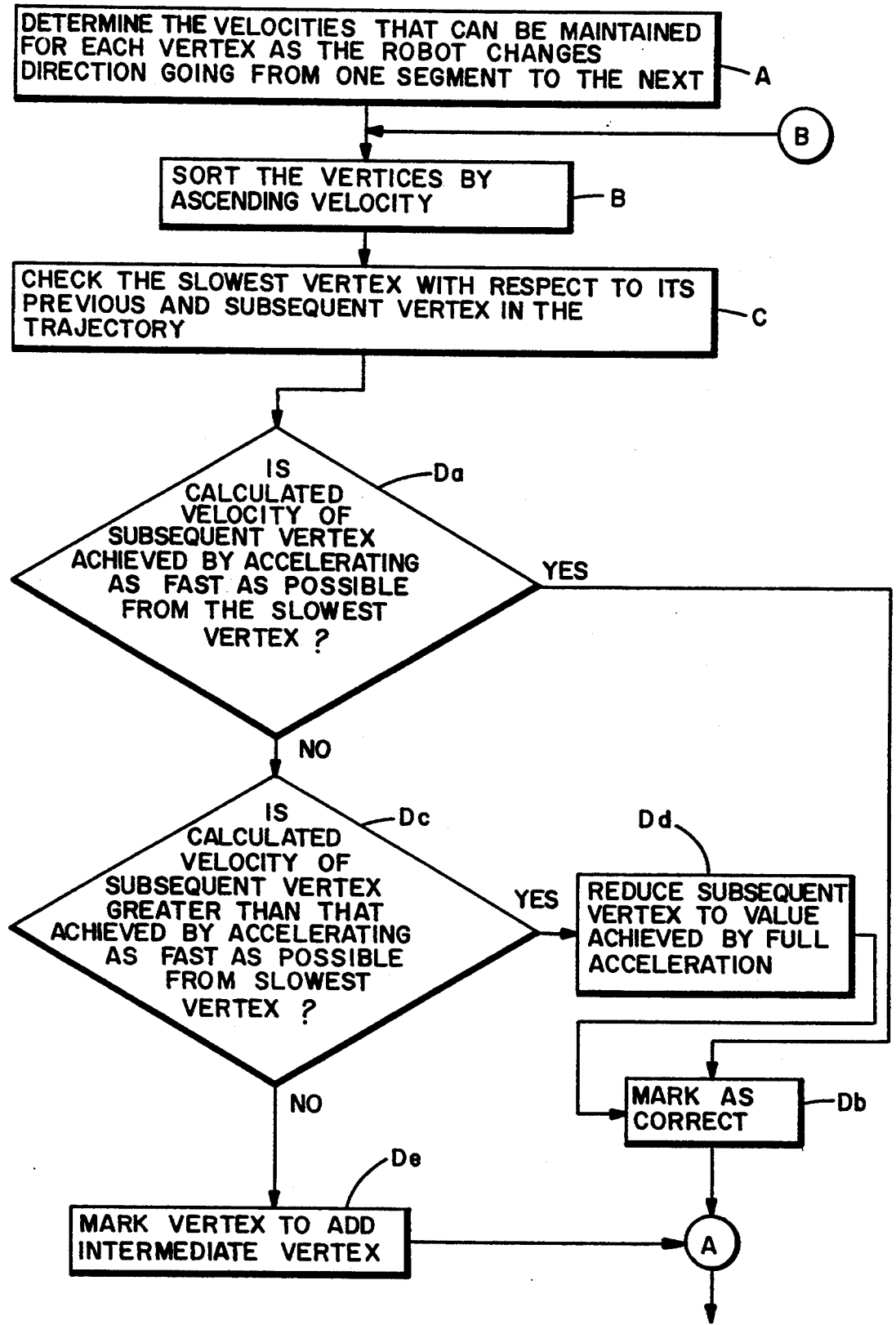

A presently preferred embodiment of the method is shown in the flowchart of FIGS. 10a and 10b.

The method operates to reduce a time required for an object, such as an extrusion nozzle, to be driven by a plurality of motors (such as SM1-SM4) over a predetermined trajectory through an n-dimensional space, wherein n is equal to or greater than two. The trajectory is defined by a list of vertices each having coordinates that define a location within the n-dimensional space, each vertex being separated from at least one other vertex by a line segment. A vertex pair is considered to be two vertices that are nearest neighbors along the trajectory and that are separated by a single straight line segment.

The method executes the following steps:

(A) determining a maximum velocity that can be maintained for each vertex as the object changes direction when being driven from one line segment to the next;

(B) sorting the vertices by ascending maximum velocity;

(C) examining a pair of vertices consisting of the slowest vertex and a subsequent vertex in the trajectory;

(Da) if the determined maximum velocity at the subsequent vertex is found to be exactly achieved by accelerating as fast as possible from the slowest vertex, (Db) marking the determined maximum velocity at the subsequent vertex as correct;

(Dc) if the determined maximum velocity at the subsequent vertex is found to be greater than the determined maximum velocity, (Dd) reducing the maximum velocity for the subsequent vertex to the value achieved by accelerating as fast as possible from the slowest vertex; and (Db) marking the reduced maximum velocity at the subsequent vertex as correct.

If the determined maximum velocity at the subsequent vertex is found to be less than the determined maximum velocity, a next step (De) marks the subsequent vertex for a subsequent addition of at least one intermediate vertex.

The method then examines a pair of vertices consisting of the slowest vertex and a previous vertex in the trajectory.

(Ea) If the determined maximum velocity at the slowest vertex is found to be exactly achieved by decelerating as fast as possible from the previous vertex to the slowest vertex, the method executes the steps of, (Eb) marking the maximum velocity at the previous vertex as correct;

(Ec) if the determined maximum velocity at the previous vertex is found to be greater than the determined maximum velocity, (Ed) reducing the maximum velocity for the previous vertex to the value achieved by decelerating as fast as possible from previous vertex to the slowest vertex; and (Eb) marking the reduced maximum velocity of the previous vertex as correct;
if the determined maximum velocity at the subsequent vertex is found to be less than the determined maximum velocity, (Ee) marking the previous vertex for a subsequent addition of at least one intermediate vertex.

(F) A next step removes the vertex having the lowest maximum velocity from the vertex list; and (G) determines if all vertex pairs have been examined. If NO at step G, the method repeats the steps (B) through (G); else
if YES at step G, the method (H) adds at least one intermediate vertex between each vertex pair previously marked for vertex addition at a velocity corresponding to maximally accelerating from the previous vertex, and deccelerating towards the subsequent vertex; and (I) determines from the resulting vertex list a sequence of motor control signals that will cause the object to be driven over the trajectory so as to achieve the indicated velocities at each vertex of the resulting vertex list.

That is, the resulting vertex list is downloaded from the processor 18, via cable 18a, to the controller 12, which then determines from the vertex list the stepper motor pulse trains for SM1-SM4 to achieve the optimum motion of the robot 1 and, hence, the fabrication tool 14.

In that in FIG. 1a the motors are stepper motors, step (H) adds a single vertex if a full acceleration from the first of the pair of vertices, and a full deceleration to the second of the pair of vertices, results in a position, along the line segment connecting the pair of vertices, where the accelerating and decelerating velocities are the same, and which is an integer number of stepper motor steps from both vertices, and where the velocity at the intersection is less than a maximum allowable velocity.

If a full acceleration, followed by full deceleration, along the line segment between the pair of vertices will cause the velocity to reach a maximum allowable velocity, the step (H) adds a first vertex at a point on the line segment where the velocity first reaches the maximum allowable value, and a second vertex at a point on the line segment whereat a full acceleration will result in the second vertex being reached at the determined maximum velocity.

If a full acceleration ramp and a full deceleration ramp intersect at a non-integer number of stepper motor steps, the step (H) adds two vertices along the line segment that are separated by one stepper motor step that results in neither an acceleration or a deceleration.

A C-language subroutine is attached hereto as Appendix A (move_compile ()) that implements the foregoing steps for a rapid prototyping application. The resulting vertex list is executed by subroutine (haul()) by the open loop controller 12 in real time.

The real time stepper motor controller 12 must know at what rate and in what direction to pulse each motor SM1–SM4 during the entire trajectory. While not necessary, it will be assumed in what follows that the controller 12 performs a software delay to determine the time between the pulses to the axis requiring the most numbers of steps over a particular segment (referred to herein as the dominant axis for that segment). It is further assumed that pulses to the other axes are produced coincident with the dominant axis pulses, and uniformly distributed along the segment. This is done by interpolation and truncation (see haul ()).

An important feature in the implementation of the method is the use of a heap sort to find the next lowest velocity vertex, and to re-sort the two nearest neighbor vertices if their velocities are altered. For N vertices, the vertex list is re-sorted maximally $N-2$ times (the number sorted decreases by one with each sort). As a result, it is desirable that the sorting process be efficient. The heap sort provides a log (N) sort time, and identifies the lowest velocity remaining vertex (the top of the heap). A suitable heap sort algorithm is disclosed by R. Sedgewick, Algorithms, Addison-Wesley, New York, 1988, ISBN 0-201-06673-4, pp. 132–139.

Another important time-saving feature in the implementation of the method is an efficient and reliable means to determine the maximum velocity associated with a given vertex.

In this regard, it is assumed that the Pythagorean length of both segments adjoining a vertex has been predetermined. For a rapid prototyping application this is generally true because the length of each segment determines an amount of material to be added or removed. For a rapid prototyping system having an extrusion head, this implies that a required number of extrusion pump steps has been predetermined for each segment connected at a given vertex.

It is noted that, for 3% rms accuracy, $$\text{max} = \text{maximum of } \{|x|, |y|, |z|\}$$

$$\sqrt{x^2 + y^2 + z^2} \simeq \frac{4373(\text{max}) + 3062(|x| + |y| + |z|)}{2^{13}}$$

It is also assumed that each axis is independent, and that the time response of each axis is approximately the same. The numbers appearing in the numerator are derived from a numerical fit.

If axis i moves a distance $d_i$ for each step, and if the average acceleration from a standing start for axis i is $a_i$, a relationship for the time required to take the first step is given by:

$$\tau_i = \sqrt{\frac{2d_i}{a_i}}.$$

While the loads and forces on each axis may be different, the step distance $d_i$ can be adjusted for each axis so that the response time $\tau_i$ is approximately the same for all axes.

Figure 2:
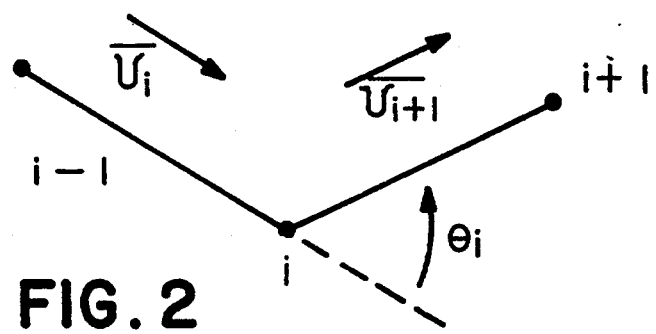
FIG. 2 graphically depicts a velocity determination technique employed by the invention.

Using these assumptions, the velocity associated with each vertex can be determined as shown in FIG. 2.

In moving from vertex $i-1$ to i to $i+1$, the trajectory is deflected by $\theta_i$, where $$\cos\theta_i = \frac{\bar{v}_i \cdot \bar{v}_{i+1}}{|\bar{v}_i| \cdot |\bar{v}_{i+1}|}.$$

It is assumed that the only acceleration at the vertex is centripetal; i.e. the velocity along the direction of motion is constant $|\bar{v}_i| = |\bar{v}_{i+1}| = d/\tau$, where $\tau$ is the minimum time per step for any axis, and d is the step distance of the highest velocity axis. For small deflection angles, the average centripetal acceleration is $$2\frac{d}{\tau_i^2} \cos\frac{(\pi - \theta)}{2}$$

Solving for the time per step yields:

$$\tau_i = \sqrt{\frac{d}{\sqrt{2}\,a}} \sqrt[4]{1 - \cos\theta}$$

Since $\sqrt{d/a}$ is the same for all axes, the time delay between pulses is independent of the direction of motion.

Since the segments are linear, the $\cos(\theta_i)$ can be determined as:

$$\cos(\theta_i) = \frac{x_i \cdot x_{i+1} + y_i \cdot y_{i+1} + z_i \cdot z_{i+1} + p_i \cdot p_{i+1}}{\sqrt{x_i^2 + y_i^2 + z_i^2 + p_i^2}\,\sqrt{x_{i+1}^2 + y_{i+1}^2 + z_{i+1}^2 + p_{i+1}^2}}.$$

The determined value of $\cos(\theta_i)$ is preferably used to index into a look-up table to obtain the delay time $\tau_i$ between pulses for the fastest moving axis, also referred to as the master axis. It should be noted that the master axis may also be defined to be a virtual axis having an associated movement that is faster than any of the real axes. Clearly, the velocity of vertex i becomes $$|v_i| = \frac{d_i}{\tau_i}.$$

It is not necessary for the response times of each axis to be the same, or for the different axes to be independent. The determination of the velocity of a given vertex is similar, but more involved in these cases.

Figure 3:
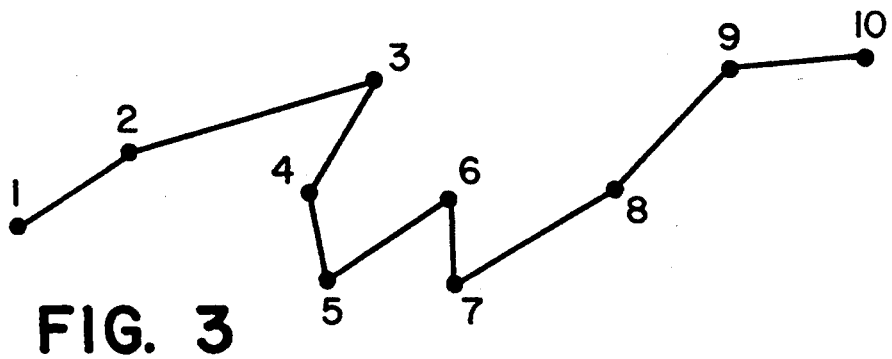
FIG. 3 graphically illustrates an exemplary desired trajectory for a robot, the trajectory including a plurality of vertices.

With respect to the re-setting of vertex velocities, a procedure that guarantees that the robot does not reach any vertex with more velocity than a maximum velocity when going around that vertex is best understood with respect to FIG. 3, which illustrates an exemplary robot trajectory in x-y.

Figure 4:
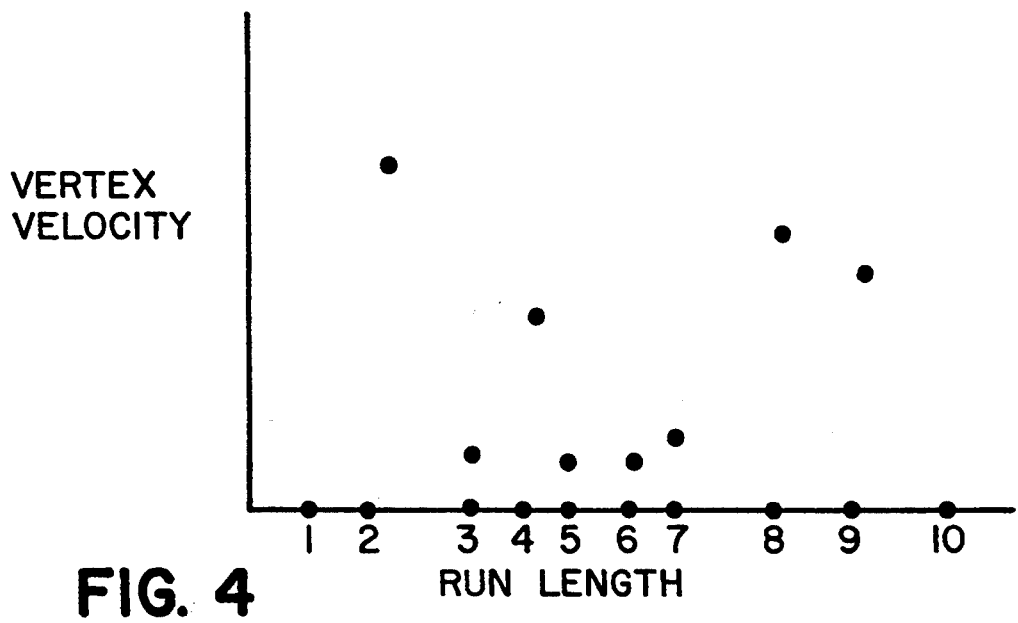
FIG. 4 is a plot of computed vertex velocities.

For a given segment i, let $max_i = $ maximum $\{|x_i|, |y_i|, |z_i|, |p_i|\}$, define $$\text{run length}_i = \sum_{j=1}^{i}$$

similar to the total length traveled). A plot of the computed vertex velocities with respect to run length is shown in FIG. 4.

Figure 5:
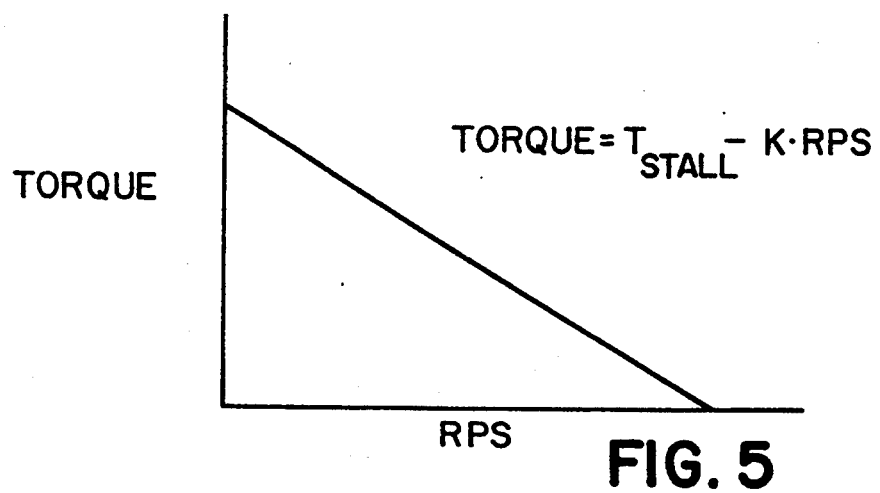
FIG. 5 graphically depicts a stepper motor torque curve.
Figure 6:
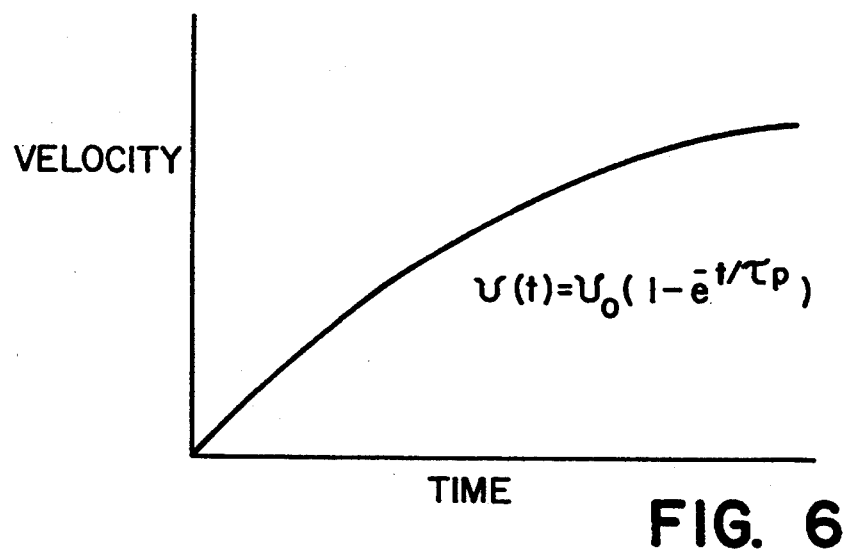
FIG. 6 graphically depicts a resulting velocity profile for the torque curve of FIG. 5.

A slightly non-standard scale for velocity is used to facilitate later calculations. If the torque curve for a motor is modeled as torque = $T_{stall} - K \cdot RPS$, as shown in FIG. 5, it is found that the velocity profile is $$v(t) = v_o(1 - e^{-t/\tau_p}),$$

as shown in FIG. 6.

In the preferred implementation, using a microprocessor for the controller 12, the velocity of an axis is $$v = d/(n \cdot \tau_d),$$

where d is the step distance, $\tau_d$ is the time for a single software delay loop, and n is the number of delay loops executed.

A velocity ramp is established as an indexed array of delay loop counts $\{n_i\}$. An acceleration thus involves the use of, by example, $n_{j+1}$ delay loops for a next step. Therefore, only a discrete number of velocities $v_j$ are available:

$$v_j = d/(n_j \tau_d).$$

Figure 7:
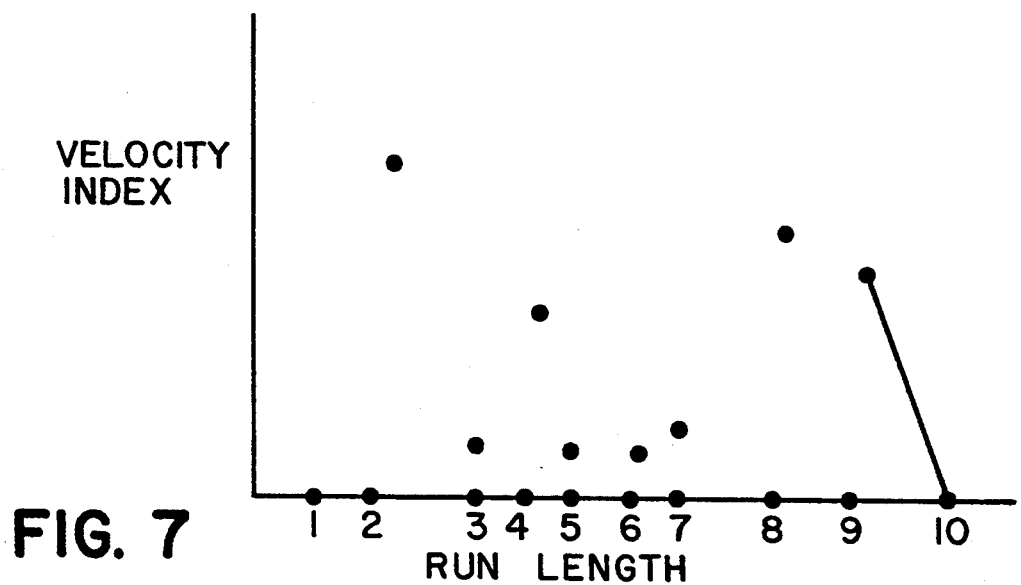
FIG. 7 plots velocity indices against run length.

The method of denoting velocities by an integer index value and move distances by cumulative master axis steps is useful because an acceleration always appears as a +45° slope line, and similarly a deceleration is a −45° slope line. The object is to provide a velocity index, with respect to run length, of a type shown in FIG. 7, and to therefore connect all vertices with ±45° sloped lines. In the case shown in FIG. 7, only vertices 9-10 are so connected.

Figure 8:
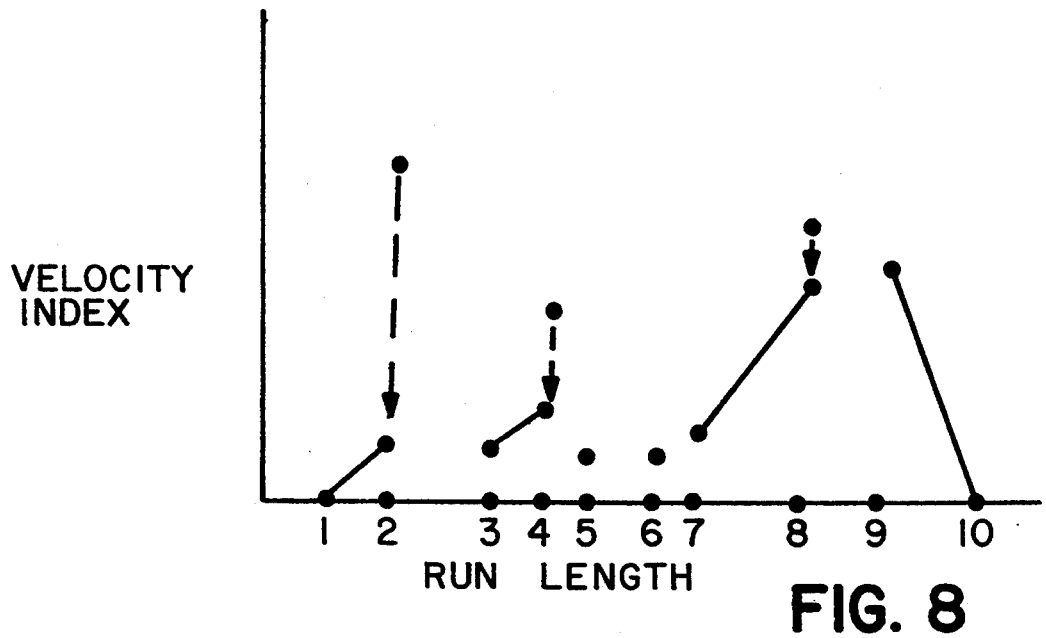
FIG. 8 illustrates a revised plot of velocity indices against run length, after applying a step of the flowchart of FIG. 10.

FIG. 8 shows the result of applying steps C, D and E as described with respect to FIGS. 10a and 10b. Vertices that are too fast to be achieved with the nominal acceleration from either nearest neighbor vertices are thus reset to lower velocities.

Figure 9:
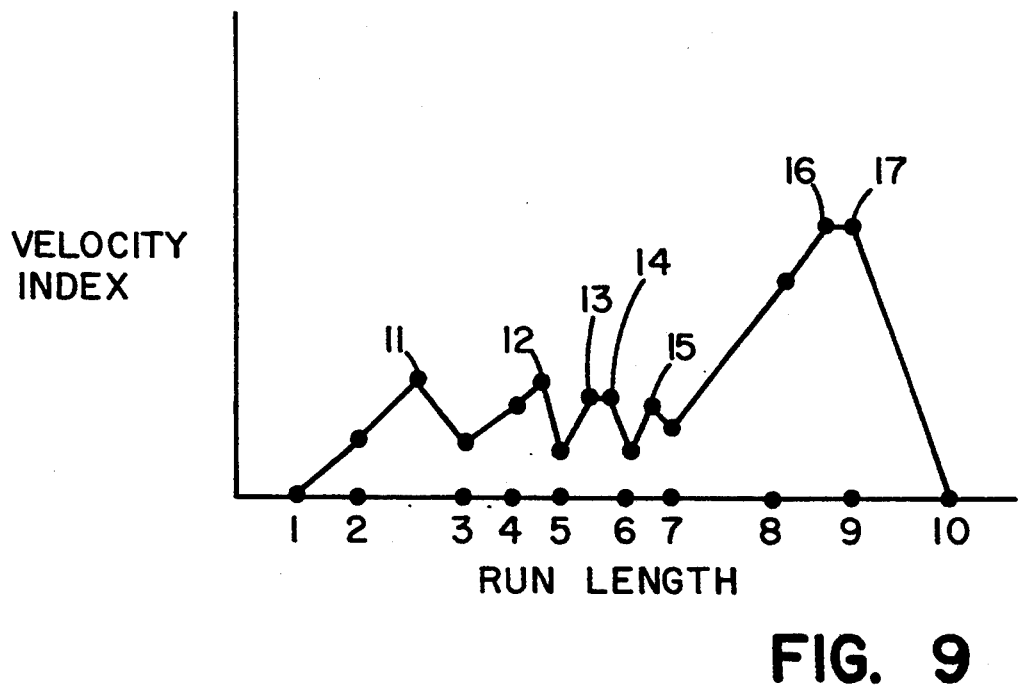
FIG. 9 illustrates a further revised plot of velocity indices against run length, after adding vertices in accordance with the flowchart of FIG. 10.

Having determined vertices with optimal "correct" velocities, and having reset the velocities of fast vertices, as required, vertex addition is next performed. If a segment is long, compared to the difference between its start vertex velocity and end vertex velocity, time is saved by allowing the robot 1 to first accelerate and then decelerate along the segment. This is equivalent to adding the vertices 11-17, as shown in FIG. 9.

Because only discrete velocity indices and run lengths are valid, these are cases where the acceleration and deceleration ramps meet at a half-integer.

In these cases, such as between vertices 5 and 6, two vertices are added (13 and 14) on the nearest integer values.

There are also cases where the acceleration and deceleration ramps would meet at velocities greater than the robot can achieve. This typically will not be the case if the exponential velocity relation (FIG. 6) is used. For this case, two vertices are inserted at the maximum velocity (e.g. vertices 16 and 17).

The move_compiler subroutine (Appendix A) is repeatedly called. Each time the move_compiler subroutine is called a new requested tool 14 position is supplied through global variables (x-requested, y-requested, z-requested). If this is the first call of a sequence, vertices 0-2 are initialized. The requested move is tested for limit violations. If necessary, it is broken up into a series of smaller moves, so that 16-bit integers can be used. The Pythagorean length is computed and material extrusion pump steps are computed, if required. The maximum possible velocity of the previous vertex is then computed. The above procedure is repeated for each call to the move-compiler subroutine until the allocated memory is full, or until the routine indicates the end of the sequence. Next (after routine dump-it) extra moves to enhance material deposition are added.

Next, the vertices are sorted by slowest velocity by the heap sort algorithm.

Next, the nearest neighbor vertices, to the slowest vertex, are tested to see if they are too fast or too slow. If too fast, their velocities are reduced and the heap is resorted. The slowest vertex is then removed from the heap and the procedure repeated till the heap is empty.

Next, one or two vertices are added along those segments that can support an acceleration followed by a deceleration.

Finally, the data is passed to haul (), which generates the stepper motor pulse sequences in real time.

Figure 1B:
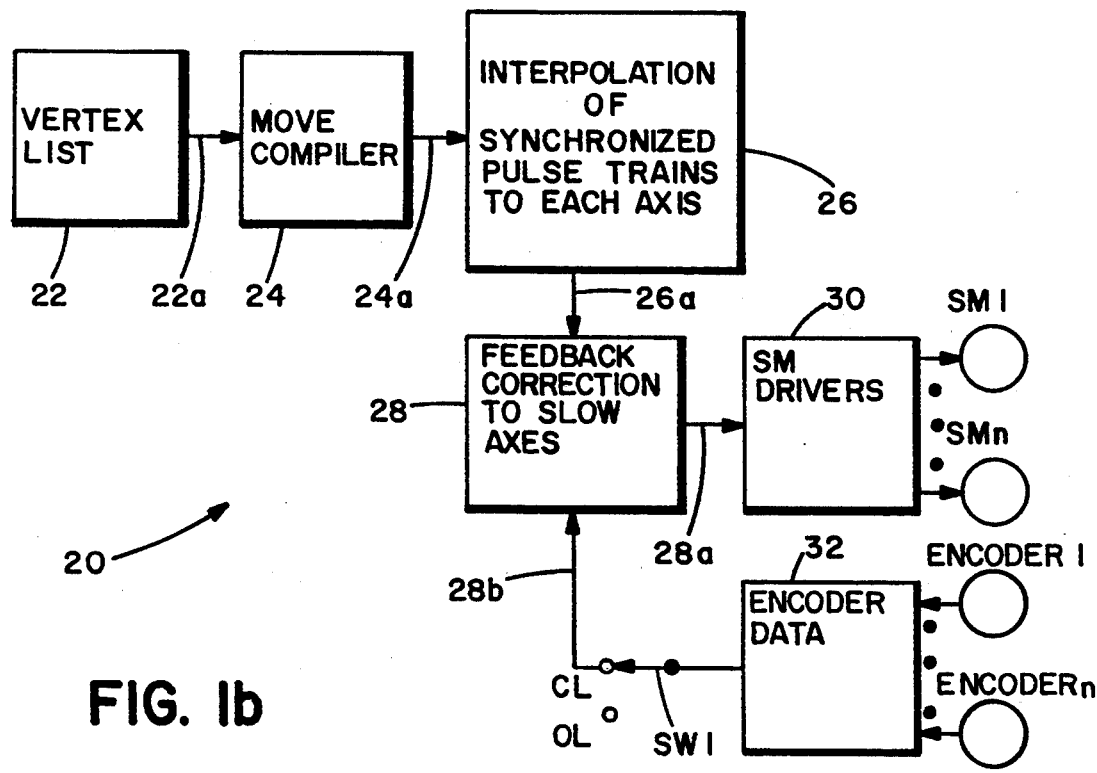
FIG. 1b is a block diagram of a further embodiment of the invention.

FIG. 1b illustrates a further embodiment of the invention wherein the operations of the haul () routine are implemented in hardware (specifically the block 26).

In FIG. 1b a robotic system 20 includes a vertex list 22 that is output from a trajectory generator (not shown). An output 22a of the vertex list provides vertices to a move compiler 24 which implements steps of the method as described in detail above. The output 24a of the move compiler 24 is a list comprised of a number of steps for each axis, and also the speed of the master axis. Block 26 implements the functions of the haul() routine and interpolates synchronized pulse trains for each of the axes. The output of the block 26 is provided to a feedback block 28 having an output 28a that is provided to a stepper motor driver block 30. The stepper motor driver block 30 has a plurality (n) outputs for driving stepper motors 1−n.

The system 20 further include n encoders, one for each stepper motor, having outputs that are provided to an encoder data block 32. The block 32 digitizes the encoder outputs and provides this data as in input 28b to the feedback block 28. Each encoder output is representative of a position of the associated stepper motor.

In general, and as is indicated by the switch SW1, the system 20 operates in an open loop (OL) configuration when accelerating one or more of the stepper motors, and operates in a closed loop (CL) configuration if it becomes necessary to reposition one or more of the stepper motors. Closed loop operation may be necessary if, for example, a stepper motor were to stall while accelerating or decelerating.

In operation, the feedback block 28 compares the expected position of each axis with its actual position, as indicated by the associated encoder data. If the two positions are different, and if the axis is not a master axis, and if the step rate of the axis is below a preset threshold, then correction steps are output by the feedback block 28 to restore the errant axis to the desired position.

The interpolation block 26 may be implemented as an Application Specific Integrated Circuit (ASIC) which performs the functions of the haul() routine in a rapid manner. The blocks 22 and 24 may be contained within an attached processor, such as a workstation, and the link 24a is then a communication link between the workstation and the interpolation block 26 of the actual robot. The feedback block 28 may be implemented with a separate processor that performs the functions of outputting stepper motor drive signals, comparing expected versus actual positions, and generating correcting step sequences when required.

As was noted previously, the teaching of this invention is not limited to rapid prototyping systems, and is not limited for use only with stepper motors. For example, the teaching of the invention can be employed with synchronous motors wherein each motor is provided with closed loop control through the use of an encoder or similar feedback sensor. In this case the minimum resolvable distance (for example one half mil) is employed as a "step size" and the command stream output by the move compiler is used an an input to each synchronous motor/encoder combination. The use of the invention enables the closed loop gain to be decreased, thereby improving stability, while providing the benefit of preprocessing the required trajectories to enable rapid and globally optimal positioning.

Thus, while the invention has been particularly shown and described with respect to preferred embodiments thereof, it will be understood by those skilled in the art that changes in form and details may be made therein without departing from the scope and spirit of the invention.

Having thus described my invention, what I claim as new, and desire to secure by Letters Patent is:

1. A method for reducing a time required for an object to be driven by a plurality of motors over a predetermined trajectory through an n-dimensional space wherein n is equal to or greater than two, the trajectory being defined by a list of vertices each having coordinates that defined a location within the n-dimensional space, each vertex being separated from at least one other vertex by a line segment, comprising the steps
   (a) determining a maximum velocity that can be maintained for each vertex as the object changes direction when being driven from one line segment to the next;
   (b) sorting the vertices by ascending maximum velocity;
   (c) examining a pair of vertices consisting of a slowest vertex and a subsequent vertex in the trajectory;
   (d) if the determined maximum velocity at the subsequent vertex is found to be exactly achieved by accelerating as fast as possible from the slowest vertex,
   (d1) marking the determined maximum velocity at the subsequent vertex as correct;
   (e) if the determined maximum velocity at the subsequent vertex is found to be greater than the determined maximum velocity,
   (e1) reducing the maximum velocity for the subsequent vertex to the value achieved by accelerating as fast as possible from the slowest vertex; and
   (e2) marking the reduced maximum velocity at the subsequent vertex as correct;
   (f) if the determined maximum velocity at the subsequent vertex is found to be less than the determined maximum velocity,
   (f1) marking the subsequent vertex for a subsequent addition of at least one intermediate vertex;
   (g) examining a pair of vertices consisting of a slowest vertex and a previous vertex in the trajectory;
   (h) if the determined maximum velocity at the slowest vertex is found to be exactly achieved by decelerating as fast as possible from the previous vertex to the slowest vertex,
   (h1) marking the maximum velocity at the previous vertex as correct;
   (i) if the determined maximum velocity at the previous vertex is found to be greater than the determined maximum velocity,
   (i1) reducing the maximum velocity for the previous vertex to the value achieved by decelerating as fast as possible from the previous vertex to the slowest vertex; and
   (i2) marking the reduced maximum velocity of the previous vertex as correct;
   (j) if the determined maximum velocity at the subsequent vertex is found to be less than the determined maximum velocity,
   (j1) marking the previous vertex for a subsequent addition of at least one intermediate vertex;
   (k) removing the vertex having the lowest maximum velocity from the vertex list;
   (l) determining if all vertex pairs have been examined;
   (m) if all vertex pairs have not been examined, repeating the steps (b) through (l);
   (n) all vertex pairs have been examined, adding at least one intermediate vertex between each vertex pair previously marked for vertex addition; and
   (n) determining from a resulting vertex list a sequence of motor control signals so as to cause the object to be driven over the trajectory so as to achieve the indicated velocities at each vertex of the resulting vertex list.

2. A method as set forth in claim 1, wherein the motors are stepper motors, and wherein the step (q) adds a single vertex if a full acceleration from the first of the pair of vertices, and a full deceleration to the second of the pair of vertices, results in a position, along the line segment connecting the pair of vertices, where the accelerating and decelerating velocities are the same, and which is an integer number of stepper motor steps from both vertices, and where the velocity at the intersection is less than a maximum allowable velocity.

3. A method as set forth in claim 1, wherein if a full acceleration, followed by full deceleration, along the line segment between the pair of vertices will cause the velocity to reach a maximum allowable velocity, the step (n) adds a first vertex at a point on the line segment where the velocity first reaches the maximum allowable value, and a second vertex at a point on the line segment whereat a full acceleration will result in the second vertex being reached at the determined maximum velocity.

4. A method as set forth in claim 3, wherein the motors are stepper motors, and wherein if a full acceleration ramp and a full deceleration ramp intersect at a non-integer number of stepper motor steps, the step (n) adds two vertices along the line segment that are separated by one stepper motor step that results in neither an acceleration or a deceleration.

5. A method as set forth in claim 1, wherein the step (b) is accomplished with a heap sort.

6. A method as set forth in claim 1, wherein the motors are stepper motors, wherein translating the object through a point in the trajectory from a vertex $i-1$ to $i$ to $i+1$ results in a deflection of angle $\theta_i$, and wherein step (a) employs a value of $\cos\theta_i$ to determine the maximum velocity for the vertex i where i is a positive integer greater than zero.

* * * * *

UNITED STATES PATENT AND TRADEMARK OFFICE
CERTIFICATE OF CORRECTION

PATENT NO. : 5,426,722
DATED : Jun. 20, 1995
INVENTOR(S) : John S. Batchelder

It is certified that error appears in the above-indentified patent and that said Letters Patent is hereby corrected as shown below:

Col. 5, line 22,
   after the word "object", delete "$V_i$" and substitute "$\overrightarrow{V_i}$" therefor.

Column 8, lines 20-25,
   after the word "where", delete "$\cos\theta_i = \frac{\vec{v}_i \cdot \vec{v}_{i-1}}{|v_i| \cdot |v_{i-1}|}$" and substitute "$\cos\theta_i = \frac{\overline{v}_i \cdot \overline{v}_{i+1}}{|\overline{v}_i| \cdot |\overline{v}_{i+1}|}$." therefor.

Column 9, line 17,
   after the word "$T_{stall}$-", delete the letters "K.RPS" and substitute "K•RPS" therefor.

Column 9, lines 25-26
   after the word "is", delete "v=d/(n.$\gamma$ d,)" and substitute "v=d/(n•$\gamma$d,)" therefor.

col. 12, line 34, before the word "all", add "if".

UNITED STATES PATENT AND TRADEMARK OFFICE
CERTIFICATE OF CORRECTION

PATENT NO. : 5,426,722

DATED : Jun. 20, 1995

INVENTOR(S) : John S. Batchelder

It is certified that error appears in the above-indentified patent and that said Letters Patent is hereby corrected as shown below:

col. 12, line 43 after the word "step", delete the letter "(q)" and substitute "(n)" therefor.

Signed and Sealed this

Twenty-second Day of April, 1997

Attest:

BRUCE LEHMAN

*Commissioner of Patents and Trademarks*

*Attesting Officer*